(12) United States Patent
Jansen et al.

(10) Patent No.: US 10,775,254 B2
(45) Date of Patent: Sep. 15, 2020

(54) FORCE SENSING DEVICE AND A FORCE SENSING SYSTEM

(71) Applicant: IMEC VZW, Leuven (BE)

(72) Inventors: Roelof Jansen, Leuven (BE); Xavier Rottenberg, Leuven (BE); Veronique Rochus, Leuven (BE)

(73) Assignee: IMEC VZW, Leuven (BE)

( * ) Notice: Subject to any disclaimer, the term of this patent is extended or adjusted under 35 U.S.C. 154(b) by 193 days.

(21) Appl. No.: 16/006,835

(22) Filed: Jun. 12, 2018

(65) Prior Publication Data

US 2018/0364121 A1    Dec. 20, 2018

(30) Foreign Application Priority Data

Jun. 14, 2017    (EP) .................................... 17175937

(51) Int. Cl.
    *G01L 11/02*    (2006.01)
    *G01L 13/02*    (2006.01)

(52) U.S. Cl.
    CPC ............ *G01L 11/02* (2013.01); *G01L 13/025* (2013.01)

(58) Field of Classification Search
    CPC ............................... G01L 11/02; G01L 13/025
    See application file for complete search history.

(56) References Cited

U.S. PATENT DOCUMENTS

| | | | |
|---|---|---|---|
| 4,886,361 A | 12/1989 | Fuerstenau | |
| 5,270,538 A * | 12/1993 | Vali | G01D 5/35303 250/227.18 |
| 6,975,781 B2 | 12/2005 | Takiguchi et al. | |
| 7,440,645 B2 | 10/2008 | Kurtz et al. | |
| 2006/0023988 A1 | 2/2006 | Kurtz et al. | |
| 2007/0253662 A1 * | 11/2007 | Patel | G01M 11/39 385/13 |

FOREIGN PATENT DOCUMENTS

| | | |
|---|---|---|
| AT | 392537 B | 4/1991 |
| CN | 103399378 A | 11/2013 |
| CN | 203311034 U | 11/2013 |
| CN | 203465193 U | 3/2014 |

(Continued)

OTHER PUBLICATIONS

"IC Compatible Optomechanical Pressure Sensors Using Mach-Zehnder Interferometry" By Benaissa, see attached publication. (Year: 1996).*

(Continued)

*Primary Examiner* — Xin Y Zhong
(74) *Attorney, Agent, or Firm* — Moser Toboada (57) ABSTRACT

A force sensing device comprises: a membrane (120), which is configured to deform upon receiving a force; a first Mach Zehnder-type interferometer device (110); a second Mach Zehnder-type interferometer device (130), wherein a first measurement propagation path (114) of the first Mach Zehnder-type interferometer device (110) and a second measurement propagation path (134) of the second Mach Zehnder-type interferometer device (130) are arranged on or in the membrane (120), and wherein the first measurement propagation path (114) and the second measurement propagation path (134) are differently sensitive to applied force on the membrane (120).

10 Claims, 7 Drawing Sheets

(56) References Cited

FOREIGN PATENT DOCUMENTS

| JP | S61239132 A | 10/1986 |
|---|---|---|
| JP | S61239133 A | 10/1986 |
| JP | S61239134 A | 10/1986 |
| WO | WO-2012162809 A1 | 12/2012 |

OTHER PUBLICATIONS

Stowe et al., "Demodulation of Interferometric Sensors Using a Fiber-Optic Passive Quadrature Demodulator", Journal of Lightwave Technology, vol. 1, Issue 3, pp. 519-523, Sep. 1983.

Benaissa et al., "IC Compatible Optomechanical Pressure Sensors Using Mach-Zehnder Interferometry", IEEE Transactions on Electron Devices, vol. 43, Issue 9, pp. 1571-1582, Sep. 1996.

Hoekman et al., "Design of a Spiral-Shaped Mach Zehnder Interferometric Sensor for Refractive Index Sensing of Watery Solutions", Proceedings Workshop IEEE/LEOS Benelux Chapter, Eindhoven, pp. 13-14, 2007.

Jeong et al., "Si-nanowire-based Multistage Delayed Mach-Zehnder Interferometer Optical MUX/DeMUX Fabricated by An ArF-Immersion Lithography Process on a 300 mm SOI Wafer", Optics Letters, vol. 39, Issue 13, pp. 3702-3705, Jul. 1, 2014.

\* cited by examiner

FORCE SENSING DEVICE AND A FORCE SENSING SYSTEM

CROSS-REFERENCE TO RELATED APPLICATIONS

This application claims priority to and the benefit of European Patent Application No. 17175937.6, filed on Jun. 14, 2017, the disclosure of which is incorporated herein by reference in its entirety.

TECHNICAL FIELD

The present inventive concept relates to a force sensing device and a force sensing system. In particular, the present inventive concept relates to force sensing using a Mach Zehnder-type interferometer device.

BACKGROUND

Pressure sensors are widely used in multiple applications, such as automotive applications, medical diagnostics, altitude and depth measurements and flow sensing.

Use of opto-mechanical pressure sensors has recently become focus of increasing attention. Sensors based on opto-mechanical solutions may provide a high sensitivity in combination with a low noise level, which makes opto-mechanical pressure sensors interesting in relation to pressure sensors based on piezoelectric or capacitive technology.

An opto-mechanical pressure sensor may be based on a Mach Zehnder-type interferometer (MZI) device, wherein light is split into two paths. One of the paths, a measurement path, is subject to a pressure affecting light propagation through the path, whereas the other path, a reference path, works as a fixed reference. The light from the measurement and reference paths is then recombined and an optical intensity output from the MZI device is dependent on the phase difference of light between the two paths and, thus, on the pressure the measurement path is subject to.

The intensity of light output by the MZI device may thus be used for measuring a pressure with a high sensitivity. However, a range of sensitivity of the MZI device is limited by the phase shift caused by the pressure to which the measurement path is subject to. Thus, if the phase shift is above $\pi$ radians, it is not possible to differentiate the intensity output from the MZI from a phase shift below $\pi$ radians. Hence, a sensitivity range of the MZI device is limited to phase shifts below $\pi$ radians.

MZI devices may also be used for other types of sensing applications, not necessarily sensing a pressure. Rather, any external influence acting on the measurement path may be sensed, such as any type of force, e.g. caused by a pressure differential or by a direct force.

SUMMARY

It is an object of the present inventive concept to provide a force sensing device with a large sensitivity range, while having a high sensitivity within the sensitivity range.

These and other objects of the present inventive concept are at least partly met by the invention as defined in the independent claims. Preferred embodiments are set out in the dependent claims.

According to a first aspect, there is provided a force sensing device, comprising: a membrane, which is configured to deform upon receiving a force; a first Mach Zehnder-type interferometer device, comprising a first reference propagation path and a first measurement propagation path, wherein input light is split into the first reference propagation path and the first measurement propagation path and then recombined, and a phase difference of the light from the reference and measurement propagation paths provides a measurement of the force, a second Mach Zehnder-type interferometer device, comprising a second reference propagation path and a second measurement propagation path, wherein input light is split into the second reference propagation path and the second measurement propagation path and then recombined, and a phase difference of the light from the reference and measurement propagation paths provides a measurement of the force, wherein the first measurement propagation path and the second measurement propagation path are arranged on or in the membrane, and wherein the first measurement propagation path and the second measurement propagation path are differently sensitive to applied force on the membrane.

Thanks to the use of two Mach Zehnder-type interferometer (MZI) devices having different sensitivity to the applied pressure, the sensitivity range of the force sensing device may be greatly increased. The two MZI devices may form a highly sensitive MZI device, which is able to determine a force received by the membrane very accurately but in a narrow pressure range, and a broad range MZI device, which is able to determine the force coarsely in a broad range. The broad range MZI device may thus indicate which force range that is applicable for the highly sensitive MZI device, such that the highly sensitive MZI device may be used for determining a force even though the phase shift is above $\pi$ radians.

The broad range MZI device could be used for merely for determining a force range that applies to the highly sensitive MZI device. Thus, a force value determined by the broad range MZI device is not necessarily used for providing a reading as such of the applied force on the membrane. However, it should be realized that the broad range MZI device may alternatively provide a direct force measurement. In such case, the highly sensitive MZI device and the broad range MZI device may be complementary to each other, such that in a narrow range of small forces, a very accurate force may be determined using the highly sensitive MZI device, whereas for larger forces spanning a broader range, a coarser determination of the force may be done using the broad range MZI device.

It should be realized that more than two different MZI devices may be used, wherein each of the measurement propagation paths of the MZI devices has a unique sensitivity to applied force. Hence, the MZI devices may complement each other so as to define different force ranges and/or enable exact determination of a force range that is applicable for the most highly sensitive MZI device.

Since the measurement propagation paths of the MZI devices are arranged on or in the same membrane, the MZI devices are subject to the same force and thermal inputs, which means that the force sensing device will not be affected by force or thermal gradients in an environment in which measurements take place. Also, a size of the membrane need not be significantly affected by the arrangement of two measurement propagation paths on or in the membrane. In particular, a size required by the broad range MZI device may be insignificant in relation to a size of the membrane required by the arrangement of the highly sensitive MZI device on or in the membrane.

The force sensing device may be used for performing a pressure measurement so as to determine an absolute pressure or a differential pressure. However, the force sensing device may alternatively provide a dynamic pressure response to be used in an accelerometer, or a microphone, or provide a sensing of a force due to inertia, which may be useful in a gyroscope. The force sensing device may include a pressure-sensitive membrane which may be affected by a constant pressure or a varying pressure (such as a pressure wave) and the force sensing device may determine the pressure affecting the pressure-sensitive membrane. The force sensing device could alternatively be used for sensing a direct or indirect force applied on the membrane.

The force sensing device could be used for determining any force that causes the measurement propagation paths to be elongated or shortened in the membrane. This could be used for sensing a stretching or compression of a material and could also be used for determining a thermal influence.

According to an embodiment, the first measurement propagation path and the second measurement propagation path are configured to cause a phase shift of light propagated through the measurement propagation paths, wherein the phase shift is dependent on applied force on the membrane and the caused phase shift is different between first measurement propagation path and the second measurement propagation path.

Hence, the differing sensitivity of the first measurement propagation path and the second measurement propagation path in relation to applied force may be manifested in the phase shift occurring in the measurement propagation path in response to an applied force on the membrane.

Properties of the first measurement propagation path and the second measurement propagation path may differ in order to provide different sensitivities of the first measurement propagation path and the second measurement propagation path in relation to applied force. Some different properties that may be different for the first and second measurement propagation paths are indicated below. The first and second measurement propagation path may differ in relation to one or more of these properties. Also, the first and second measurement propagation path may differ in relation to further properties.

According to an embodiment, the first measurement propagation path is longer than the second measurement propagation path. This may imply that when a shape of the membrane is altered due to an applied force, a change in length of the first measurement propagation path differs from a change in length of the second measurement propagation path and, hence, the induced phase shift differs.

According to an embodiment, the first measurement propagation path is spiral-shaped. A spiral-shaped measurement propagation path may be advantageous in that it enables a long propagation path to be provided in a small area, so that a size of the membrane may still be small.

According to an embodiment, the second measurement propagation path is spiral-shaped, and a number of loops of the spiral-shape and/or a radius of the spiral-shape differs between the first measurement propagation path and the second measurement propagation path. Thus, both the first and the second measurement propagation paths may be spiral-shaped enabling large lengths of both measurement propagations paths within a small-size membrane. The lengths of the first and second measurement propagation paths may differ in that a number of loops in the spiral-shapes differ and/or that a radius of the spiral-shapes differs.

According to an embodiment, the first measurement propagation path is centrally arranged in or on the membrane and the second measurement propagation path is arranged outside the spiral-shape of the first measurement propagation path. Such arrangement of the spiral-shaped first measurement propagation path and the second measurement propagation path is easily provided on or in the membrane. The first and second measurement propagation paths may be arranged in the same plane and close to each other without intersecting each other so as to enable arrangement of the paths on or in a small-size membrane. As the first and second measurement propagation paths may also be arranged in the same plane, the first and second measurement propagation paths may be simultaneously formed during manufacturing of the force sensing device, so as to facilitate manufacturing of the force sensing device.

According to an embodiment, the first measurement propagation path and the second measurement propagation path are differently positioned in relation to a center of the membrane.

The membrane may be arranged extending essentially in a plane having a small thickness and may be supported at edges of the membrane, while upper and/or lower surfaces of the membrane are exposed to a pressure. By the first and second measurement propagation paths being differently positioned in relation to a center (of the plane) of the membrane, the first and second measurement propagation paths may be differently affected by an applied force. For instance, a deflection of the membrane may be larger at a center of the membrane than at the edges, such that a length of a measurement propagation path closer to the center of the membrane may be increased to a larger extent due to an applied force than a length of a measurement propagation path closer to an edge of the membrane.

The first and second measurement propagation paths may be equally shaped and equally long, for example spiral-shaped, while arranged at different positions in relation to the center of the membrane. However, the first and second measurement propagation paths may also have different lengths in addition to being arranged at different positions in relation to the center of the membrane.

According to an embodiment, the first measurement propagation path and the second measurement propagation path are differently positioned in relation to a thickness of the membrane. A surface of the membrane may be affected to a larger extent by an applied pressure than a position in a middle of the thickness of the membrane. Thus, by the first and second measurement propagation paths being differently positioned in relation to a thickness of the membrane (e.g. one being arranged close to or on the surface of the membrane, whereas the other being arranged close to a middle of the thickness), the first and second measurement propagation paths may be differently affected by an applied force. Also, by positioning the first measurement propagation path and the second measurement propagation path differently in relation to a thickness of the membrane, it is possible to more freely design the respective measurement propagation paths as they are not arranged in the same plane. Thus, a sensitivity of a highly sensitive MZI device, requiring a long length of the measurement propagation path, need not be limited by a measurement propagation path of the broad range MZI device being arranged in the same plane (and thus limiting the possible length of the measurement propagation path of the highly sensitive MZI device).

According to an embodiment, the first reference propagation path and the first measurement propagation path have an equal length and shape. This implies that the MZI device is balanced and may be relatively insensitive to a spectral bandwidth of light input to the MZI device and to a wavelength of the light. Both the first and the second MZI device may be balanced, such that also the second reference propagation path and the second measurement propagation path may have an equal length and shape.

According to an embodiment, the force sensing device further comprises: a first light splitter and a second light splitter, such that light from the first reference propagation path is split into a first and a second reference output and light from the first measurement propagation path is split into a first and a second measurement output, a plurality of recombiners, wherein each recombiner is configured to recombine light from a pair of a reference output and a measurement output, and at least one phase influencer, such that a phase offset is caused between different pairs of recombined light.

The intensity of light output by the MZI device is of the form $$Intensity_{out} = Intensity_{in} * \left(\cos\left(\frac{\Delta\varphi}{2}\right)\right)^2,$$

where $Intensity_{out}$ is the light intensity output by the MZI device, $Intensity_{in}$ is the light intensity input into the MZI device and Lip is the phase difference of light from the measurement path and the reference path. A gradient of the cosine function is very low when the phase difference is close to zero or close to a multiple of $\pi$ radians. Hence, it is desirable that the phase difference corresponds to a linear region of the cosine function, as this implies that the pressure may be determined with a high sensitivity.

Thanks to the use of a plurality of pairs of outputs, and a phase offset between different pairs of recombined light, it may be ensured that output from at least one recombiner is within the linear region of the cosine function and, hence, provides a high sensitivity to applied force. This implies that one of the outputs of the recombiners may be selected so that the determined force may always be based on a substantially linear relation between the detected phase shift and the applied force.

The use of light splitters, recombiners and at least one phase influencer may be applied to the first MZI device, which may constitute a highly sensitive MZI device. However, the use of light splitters, recombiners and at least one phase influencer may also be applied to the second MZI device. Thus, at least one output from the second MZI device may be in a linear region of the cosine function. This may improve a determination of an applied force in a force range provided by the second MZI device. However, it may alternatively improve a possibility of correctly determining a force range that is applicable for the highly sensitive MZI device.

It should be realized that although the term "linear region" is used herein, a cosine function may not be exactly linear at all. However, the cosine function may be very close to linear or approximately linear over a relatively large range of arguments of the cosine function, whereas for arguments around 0 and multiples of $\pi$, the function is far from linear.

According to an embodiment, the first and second light splitters are configured to form two pairs of a reference output and a measurement output, wherein the at least one phase influencer is configured to cause a phase offset of $\pi/2$ between the pairs. This implies that the linear regions of the output intensity from the recombiners is evenly distributed over different phase shifts of the measurement propagation path by the applied force. Hence, one of the outputs from the recombiners should be in the linear region or at least substantially linear region enabling determining a force with a high sensitivity.

The fact that the gradient of the cosine function is low when the phase difference is close to 0 or multiples of $\pi$ and may hence impact a force determination sensitivity could alternatively be handled by having a third MZI device (or even further MZI devices), which may have a fixed phase difference between the measurement propagation path and the reference propagation path such that the linear region of the cosine function may be provided for a different force range than provided by the first MZI device.

As a further alternative, a tunable phase element may be provided in one of the measurement propagation path and the reference propagation path such that the phase difference may be tuned to always provide an output in the linear region. Using a tunable phase element may thus ensure that the output from the first MZI device (and/or the second MZI device) is always in a linear region, without requiring several outputs from the first MZI device. This implies that a strong signal may be provided in a recombiner, as the light has not been split into plural outputs. On the other hand, this could require a control system to determine when tuning of the tunable phase element is needed and may add noise to the system by means of the tunable phase element.

According to an embodiment, the force sensing device is a micro-opto-mechanical device formed on a semiconductor substrate, wherein the membrane is supported by the substrate and comprises an exposed surface which is sensitive to an applied force.

The force sensing device may thus be formed with semiconductor manufacturing technology, such as in fabrication of complementary metal-oxide-semiconductor (CMOS) devices. This implies that the force sensing device is suitable for manufacturing in very small scale and enables the force sensing device to easily be integrated into an integrated circuit arranged on a chip.

According to a second aspect, there is provided a force sensing system, comprising: the force sensing device according to the first aspect; a processing unit, which is configured to: receive a first phase shift indicating signal from the first Mach Zehnder-type interferometer device and a second phase shift indicating signal from the second Mach Zehnder-type interferometer device, determine a force interval based on the second phase shift indicating signal; and determine an accurate sensed force within the force interval based on the first phase shift indicating signal.

Effects and features of this second aspect are largely analogous to those described above in connection with the first aspect. Embodiments mentioned in relation to the first aspect are largely compatible with the second aspect.

The processing unit of the system may thus use the measurements by the first and second MZI devices and determine a force interval that is applicable for a highly sensitive MZI device (based on the phase shift detected by the broad range MZI device) and, then, determine a force with a high sensitivity based on the phase shift detected by the highly sensitive MZI device.

According to an embodiment, the force sensing device is configured to output at least two different phase shift indicating signals from the first Mach Zehnder-type interferometer device and wherein the processing unit is further configured to select one of the two different phase shift indicating signals on which to base the determining of an accurate sensed force. This implies that the processing unit may determine an output from the first MZI device which corresponds to a linear region of the cosine function, such that an output may be selected that enables determination of the force with high sensitivity.

According to a third aspect, there is provided a method for sensing a force, said method comprising: receiving a first phase shift indicating signal from a first Mach Zehnder-type interferometer device, comprising a first reference propagation path and a first measurement propagation path, wherein input light is split into the first reference propagation path and the first measurement propagation path and then recombined, wherein the first measurement propagation path is arranged on or in a membrane which is configured to deform upon receiving a force, and the first phase shift indicating signal indicates a phase difference of the light from the reference and measurement propagation paths as a measurement of the force; receiving a second phase shift indicating signal from a second Mach Zehnder-type interferometer device, comprising a second reference propagation path and a second measurement propagation path, wherein input light is split into the second reference propagation path and the second measurement propagation path and then recombined, wherein the first measurement propagation path is arranged on or in a membrane and the second phase shift indicating signal indicates a phase difference of the light from the reference and measurement propagation paths as a measurement of the force, wherein the first measurement propagation path and the second measurement propagation path are differently sensitive to applied force on the membrane; determining a force interval based on the second phase shift indicating signal; and determining an accurate sensed force within the force interval based on the first phase shift indicating signal.

Effects and features of this aspect are largely analogous to those described above in connection with the first and second aspects. Embodiments mentioned in relation to the first and second aspects are largely compatible with the third aspect.

The method may thus use measurements by first and second MZI devices and determine a force interval that is applicable for a highly sensitive MZI device (based on the phase shift detected by a broad range MZI device) and, then, determine a force with a high sensitivity based on the phase shift detected by the highly sensitive MZI device.

According to an embodiment, receiving the first phase shift indicating signal comprises receiving at least two different phase shift indicating signals from the first Mach Zehnder-type interferometer device forming a first phase shift indicating signal with a first phase offset and a first phase shift indicating signal with a second offset, wherein the method further comprises: selecting one of the first phase shift indicating signal with the first phase offset and the first phase shift indicating signal with the second offset on which to base the determining of the accurate sensed force.

This implies that the method may determine an output from the first MZI device which corresponds to a linear region of the cosine function, such that an output may be selected that enables determination of the force with high sensitivity.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
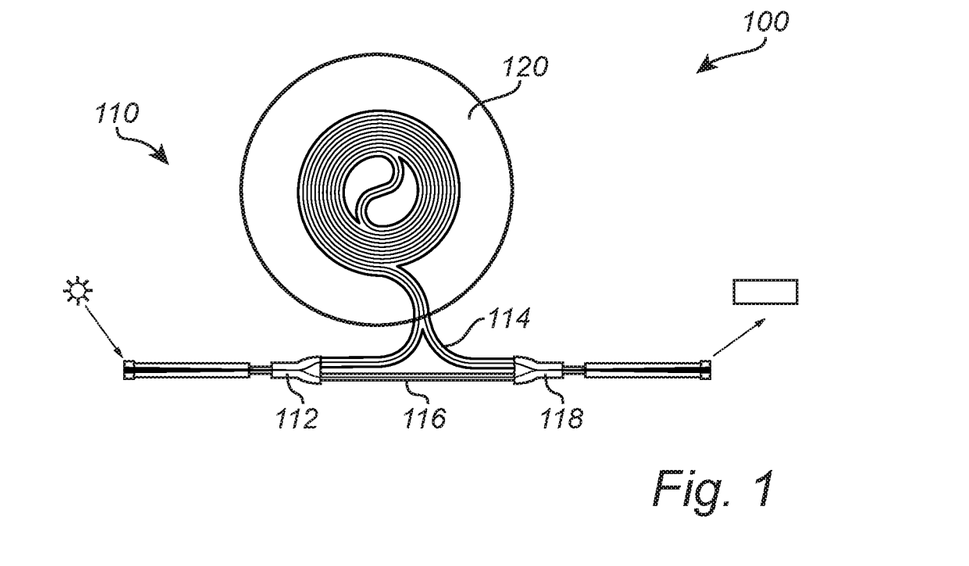
FIG. 1 is a schematic view of a force sensing device including a Mach Zehnder-type interferometer device.

Referring now to FIG. 1, a force sensing device 100 using a Mach Zehnder-type interferometer (MZI) device 110 will first be generally described. A MZI device may be used for detecting a force based on the force causing a mechanical deflection of a membrane that induces an effect on an optical propagation path, which may be detected by the MZI device. The MZI device may be produced in a small scale so as to form a micro-opto-mechanical sensor (MOMS).

An MZI device as shown in FIG. 1 comprises an interferometric splitter 112, two waveguide arms 114, 116 and a recombiner 118. One of the MZI waveguide arms 114 is placed on a flexible pressure-sensitive membrane 120, which is subjected to a differential pressure while the other MZI waveguide arm 116 acts as a fixed reference. The MZI waveguide arm 114 placed on the membrane 120 thus forms a measurement propagation path of the MZI device 110, whereas the other MZI waveguide arm 116 forms a reference propagation path.

The optical intensity emerging from the MZI device 110 depends on the phase difference of light emerging from the arms 114, 116, and thus on the differential pressure the measurement propagation path is subjected to.

Although a pressure sensing device 100 will be generally described below, it should be realized that the MZI device 110 may be arranged in many other ways, depending on the sensing application, such that an external influence affecting the measurement propagation path 114 may be sensed.

For instance, the measurement propagation path 114 may be arranged on a membrane which is affected by a force, such that a deformation of the membrane is dependent on the force. The sensing device may thus be a force sensing device 100 configured to measure or determine the force. This is particularly explained below for a pressure sensing device, but the force could be a direct or indirect force applied on the surface, or a pressure, in the form of a static pressure or a dynamic pressure, such as a sound wave.

An external influence may cause the measurement propagation path to be elongated or shortened. This could be used for sensing a force causing stretching or compression of a material, which may also be used for determining a thermal influence and, hence, for determining a temperature.

Figure 2A:
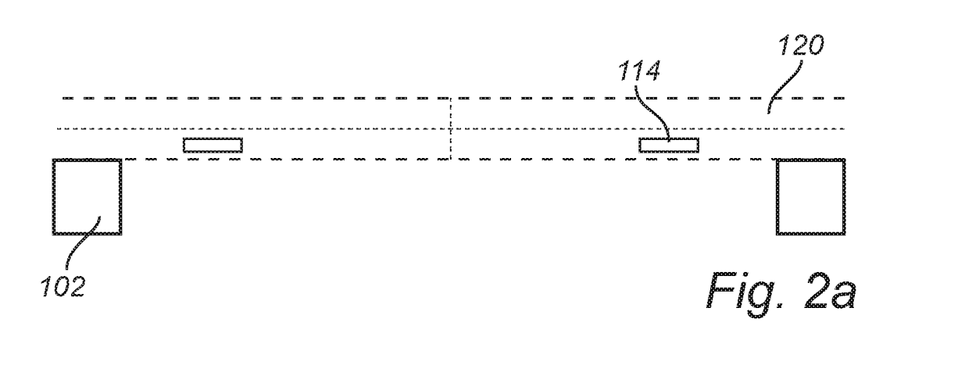
FIG. 2a is a cross-sectional view of a membrane including an arm of the Mach Zehnder-type interferometer device, in an equilibrium state.

In FIG. 2a, a cross-section of the MOMS is shown, illustrating the membrane 120 including the MZI arm 114.

The MOMS may be manufactured using semiconductor manufacturing technology, such as in fabrication of complementary metal-oxide-semiconductor (CMOS) devices. This implies that the force sensing device is suitable for manufacturing in very small scale and enables the force sensing device to easily be integrated into an integrated circuit arranged on a chip.

The MOMS may be formed on silicon substrate 102. A thin layer of membrane material may first be deposited on the silicon substrate 102. For instance, the membrane material may be silicon dioxide. The waveguide of the MZI arm 114 may be patterned in a very thin layer, e.g. of silicon nitride, applied on the silicon dioxide. Then, a top cladding of membrane material may be added on top of the MZI arm 114 and the first layer of membrane material. In order to release the sensing membrane, the silicon substrate 102 beneath the membrane material may be removed. For instance, a Deep Reacting Ion Etching (DRIE) for the backside etch may be performed to remove the silicon. Hence, the MZI arm 114 may be arranged inside the pressure-sensitive membrane 120. However, it should be realized that the MZI arm 114 may instead be arranged on an upper surface or a lower surface of the pressure-sensitive membrane 120.

Figure 2B:
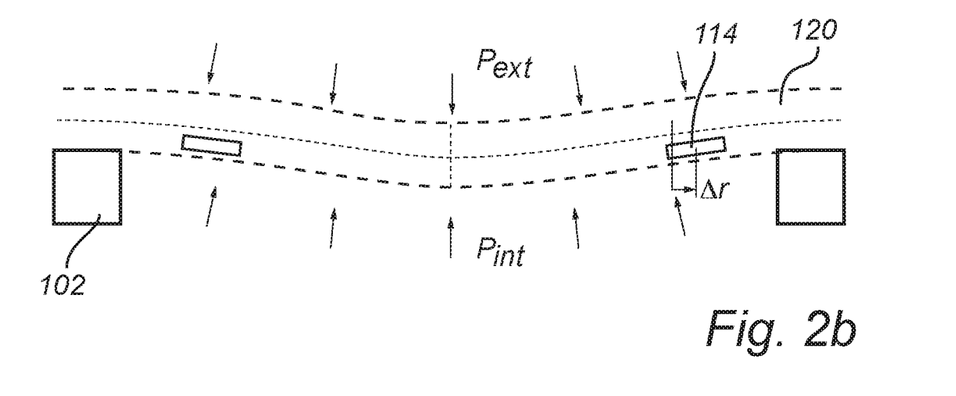
FIG. 2b is a cross-sectional view of the membrane with a pressure difference across the membrane.

As schematically indicated in FIG. 2b, when a pressure difference between an upper surface and a lower surface of the membrane 120 prevails, the membrane 120 is deflecting. Then, the position of the MZI arm 114 is changed which induces an elongation of the optical path of the measurement propagation path, hence inducing a phase shift in MZI arm 114.

The output intensity $I_{out}$ of the MZI device 110 may be evaluated by the following expression:

$$I_{out} = I_{ref} + I_{sens} + 2\sqrt{I_{ref} I_{sens}} \cos(\Delta\varphi),$$

where $I_{ref}$ and $I_{sens}$ are the light intensity of the reference propagation path and the light intensity of the measurement propagation path, respectively. The light intensity of the measurement propagation path can be slightly smaller due to additional losses in the waveguide, e.g. because of distortion of the shape of the waveguide. The phase difference $\Delta\varphi$ between the two MZI arms 114, 116 is proportional to the deflection of the membrane 120 caused by a pressure difference $\Delta P$ across the membrane 120 and can be expressed as:

$$\Delta\varphi = \frac{\pi \Delta P}{\Delta P_{range}},$$

with the pressure range $\Delta P_{range}$ being dependent on a shape and placement of the MZI arm 114 on the membrane.

For a circular shaped MZI arm 114 (or a spiral with a single loop) in the membrane 120, the pressure range $\Delta P_{range}$ may be expressed as:

$$\Delta P_{range} = \frac{\lambda_0}{4\pi n_{eff}} \frac{16D + hR^2 \sigma_0}{Z_{wg} R_{wg}(R^2 - R_{wg}^2)}.$$

For a spiral-shaped MZI arm 114 with N loops, the pressure range $\Delta P_{range}$ may be expressed as:

$$\Delta P_{range} = \frac{\lambda_0}{4\pi n_{eff}} \frac{16D + hR^2 \sigma_0}{Z_{wg} \sum_{i=1}^{N} R_{wg,i}(R^2 - R_{wg,i}^2)},$$

where $\sigma_0$ is residual stress in the membrane 120, D is flexural rigidity of the membrane 120, h is a thickness of the membrane 120, R is a radius of a circular membrane 120, $R_{wg,i}$ is a position of loop i in a radial direction of the membrane 120 and $Z_{wg}$ is a position of the arm 114 in a thickness direction of the membrane, $\lambda_0$ is a wavelength of light propagated in the MZI device 110 and $n_{eff}$ is an effective refractive index of the waveguide.

A maximal sensitivity S of the MZI device 110 is influenced by the pressure range and losses in the waveguide and may be expressed as.

$$S = \frac{\partial I_{out}/\partial I_{in}}{\partial P} = \frac{2\sqrt{I_{ref} I_{sens}}}{I_{in}} \frac{\pi}{\Delta P_{range}}.$$

Increasing the number of loops in the spiral, decreases the pressure range and increases the sensitivity.

Figure 3:
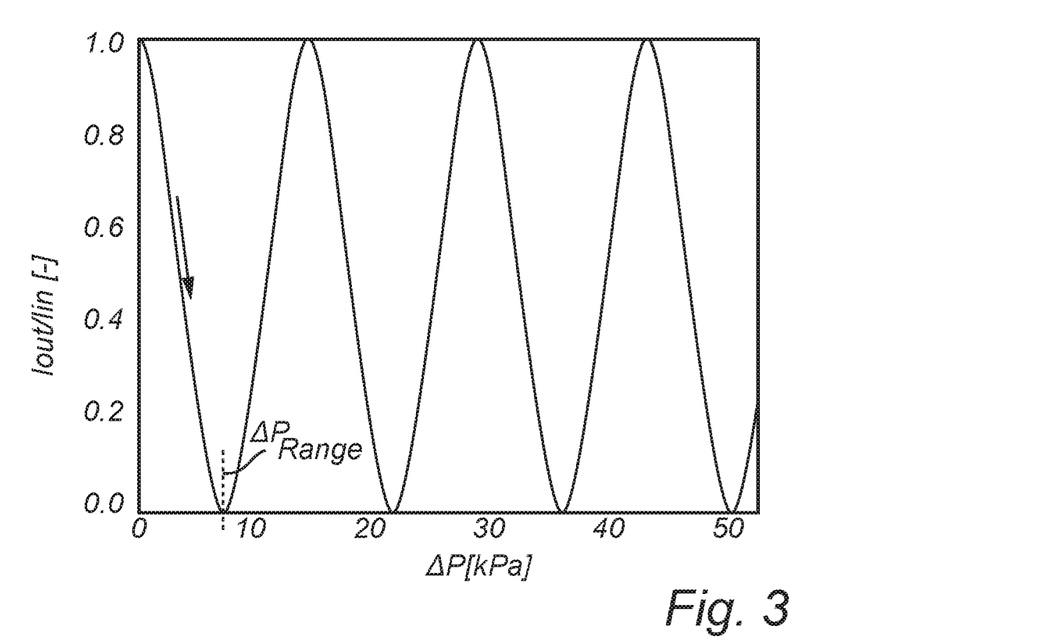
FIG. 3 is a chart illustrating a pressure sensitivity range of a Mach Zehnder-type interferometer device in a pressure sensing device.

As illustrated in FIG. 3, having a highly sensitive MZI device 110 allows determining a pressure difference $\Delta P$ across the membrane 120 with high accuracy (as a very small change in the pressure difference $\Delta P$ implies a large change in output light intensity from the MZI device 110). However, the highly sensitive MZI device 110 can only determine a pressure difference $\Delta P$ within a small pressure range $\Delta P_{range}$. As soon as the phase difference Lip becomes larger than $\pi$, it is not possible to differentiate pressure difference $\Delta P$ causing a phase shift below $\pi$ from pressure difference $\Delta P$ causing a phase shift above $\pi$. Hence, the MZI device 110 may only determine pressure differences $\Delta P$ up to a limit given by $\Delta P_{range}$.

Figure 4:
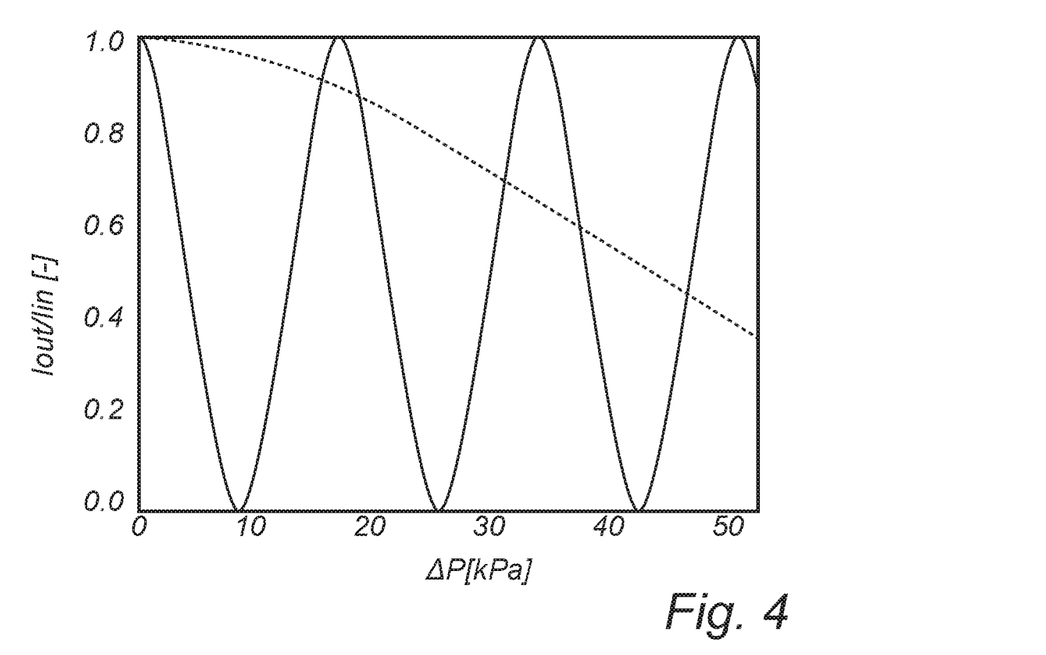
FIG. 4 is a chart illustrating pressure sensitivity range for two Mach Zehnder-type interferometer devices in a pressure sensing device.

Referring now to FIG. 4, the force sensing device 100 may be provided with two MZI devices 110, 130. The two MZI devices 110, 130 may have different sensitivity to a force on the membrane 120, such as the pressure difference $\Delta P$ over the membrane 120. As illustrated in FIG. 4 by the solid line, one of the MZI devices may be a highly sensitive MZI device 110 that has a high sensitivity to the pressure difference $\Delta P$ within a small pressure range $\Delta P_{range}$. The other MZI device, illustrated by a dashed line, may be a broad range MZI device 130 that has a low sensitivity to the pressure difference $\Delta P$ within a broad pressure range $\Delta P_{range}$.

The pressure difference $\Delta P$ coarsely determined by the broad range MZI device 130 may thus allow determining a pressure interval that applies to the highly sensitive MZI device 110. Thus, it is possible to differentiate between different parts of the periodic curve of the highly sensitive MZI device 110 so that a measurement range of the pressure sensing device 100 is significantly increased, while maintaining a high sensitivity of the pressure sensing device 100.

Figure 5:
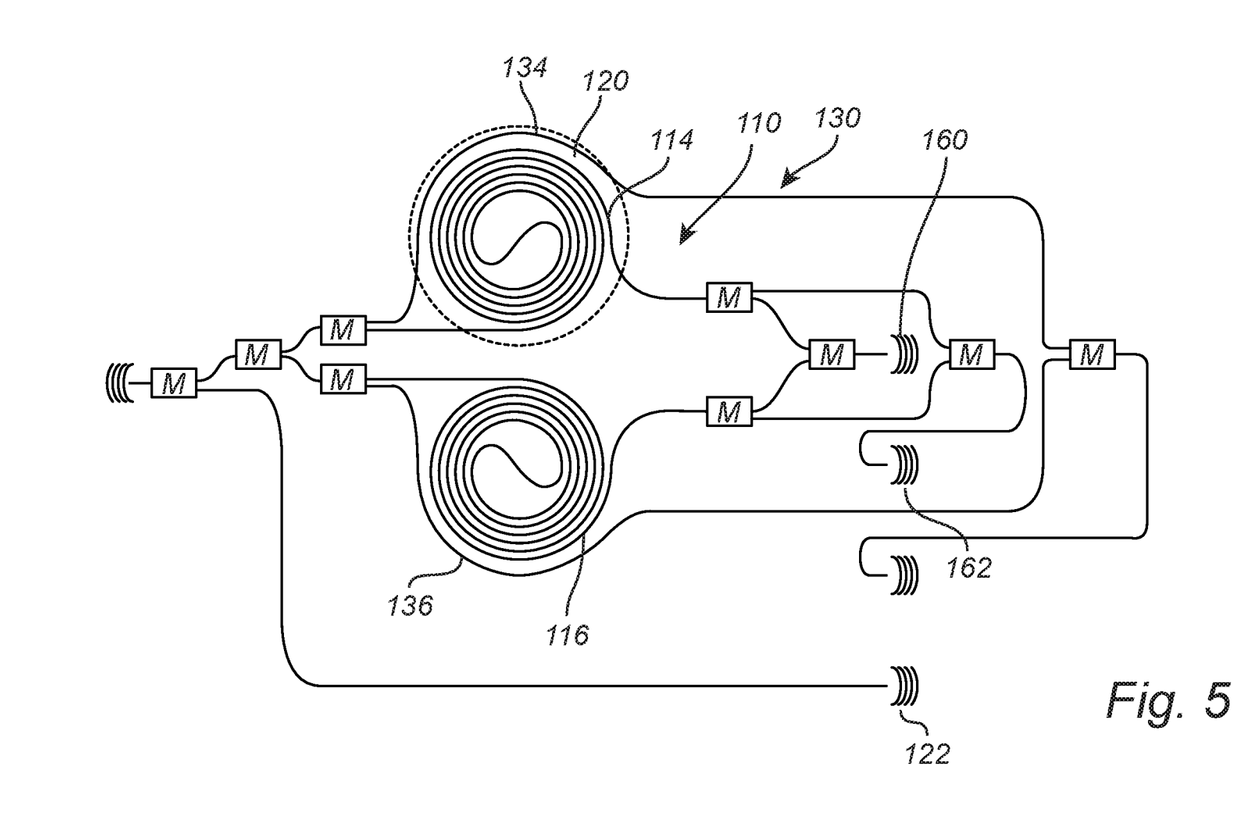
FIG. 5 is a schematic view of a force sensing device including two Mach Zehnder-type interferometer devices.

Referring now to FIG. 5, the two MZI devices 110, 130 may be arranged such that the MZI arms 114, 134 forming the measurement propagation paths of the MZI devices 110, 130 are arranged on or in the same membrane 120. This implies that the two MZI devices 110, 130 are subject to the same force, such as the pressure difference over the membrane 120 and the measurements performed by the MZI devices 110, 130 are thus related to each other.

As discussed above, the two MZI devices 110, 130 may be differently sensitive to the applied force, such as the pressure difference $\Delta P$ over the membrane 120. This may be achieved in several different manners, wherein one or more properties of the MZI arms 114, 134 of the MZI devices 110, 130 differ.

As shown in FIG. 5, a first MZI device 110 may have an arm 114 being spiral-shaped forming several loops. This implies that the first MZI device 110 may form a highly sensitive MZI device. A second MZI device 130 may have an arm 134 arranged as a single loop around the spiral shape of the first MZI device 110. The second MZI device 130 thus has a significantly lower sensitivity than the first MZI device 110, but within a significantly broader pressure range $\Delta P_{range}$.

The arrangement illustrated in FIG. 5 allows the arms 114, 134 to be arranged in the same plane and close to each other without intersecting each other so as to enable arrangement of the measurement propagation paths on or in a small-size membrane 120. The arms 114, 134 may be arranged in the same plane perpendicular to a thickness direction of the membrane 120, which implies that the arms 114, 134 may be simultaneously formed during manufacturing of the force sensing device 100, so as to facilitate manufacturing of the force sensing device 100.

It should be realized that the arms 114, 134 may differ in many different ways. For instance, the arm 114 of the highly sensitive MZI device 110 may be longer than the arm 134 of the broad range MZI device 130, e.g. thanks to the forming of more loops in the spiral-shape, but the longer length of the arm 114 compared to the arm 134 may be achieved in numerous different ways.

Further, the arms 114, 134 may differ in that the arms 114, 134 may be differently arranged in relation to a radial direction of the membrane 120, so that the arms 114, 134 are at different distances from a center of the membrane 120. The closer to the center of the membrane 120 the arm is arranged, the more sensitive the MZI device will be. Thus, the highly sensitive MZI device 110 may be arranged closer to the center of the membrane 120 than the broad range MZI device 130.

Further, the arms 114, 134 may differ in that the arms 114, 134 may be differently arranged in relation to a thickness direction of the membrane 120. A surface of the membrane may be affected to a larger extent by an applied force than a position in a middle of the thickness of the membrane. Thus, the highly sensitive MZI device 110 may be arranged closer to the surface of the membrane 120 (or on the surface of the membrane 120) than the broad range MZI device 130.

As further illustrated in FIG. 5, the reference arms 116, 136 of the MZI devices 110, 130 may have the same shape and length as the measurement arms 114, 134.

This implies that the MZI devices 110, 130 are balanced and may be relatively insensitive to a spectral bandwidth of light input to the MZI device. An unbalanced MZI device on the other hand may provide a modulated output based on the path length difference of the MZI arms. The modulated output implies that an output intensity is decreased, which may imply that the MZI device may be drastically affected by a spectral bandwidth of the input light to the MZI device. Although balanced MZI devices 110, 130 may thus be preferred, it should be realized that it is not necessary to use balance MZI devices 110, 130, e.g. if the spectral bandwidth of input light is very small, such as by using a very high quality laser.

Due to quantum noise and variation of the laser cavity, the output of the laser always contains some noise. Two types can be identified here, intensity noise and wavelength drift. The wavelength drift can be reduced by adding filter at the input of the circuit, before entering light into the interferometric splitter 112 such as, for instance, a ring resonator. The intensity noise can be corrected by adding a power tap 122, such that it is possible to subtract the intensity noise directly from the signal.

Figure 6:
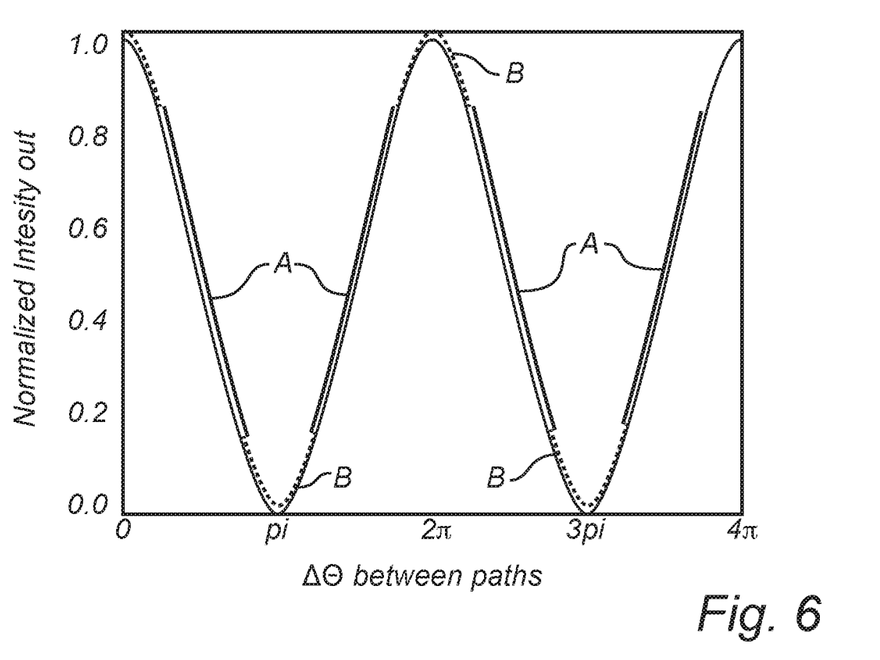
FIG. 6 is a chart illustrating linear and non-linear regions of sensitivity of a Mach Zehnder-type interferometer device in a force sensing device.

As illustrated in FIG. 6, output from a single MZI device 110 may include a highly sensitive region (indicated by solid lines A) and less sensitive regions (indicated by dashed lines B). In the highly sensitive region, there is a linear or substantially linear relation between the output intensity of the MZI device 110 and the applied force, in this case the pressure difference $\Delta P$ over the membrane 120. Thus, if an output from the MZI device 110 is in this highly sensitive region, the pressure difference $\Delta P$ can be very accurately determined. However, if the argument of the cosine function, i.e. the phase difference $\Delta \varphi$ between the two MZI arms 114, 116 is close to 0 or a multiple of $\pi$, the output from the MZI device 110 will be in a non-linear region where a change in the pressure difference $\Delta P$ has a small effect on the output from the MZI device 110. Thus, in the non-linear region, the pressure difference $\Delta P$ may not be very accurately determined.

The output from the MZI device on which a force is to be determined may be ensured to be in a linear region. This could be achieved by having a third MZI device arranged on or in the membrane 120, wherein the third MZI device may have a fixed phase difference between the measurement propagation path and the reference propagation path such that the linear region of the cosine function may be provided for a different force range than provided by the first MZI device 110.

Alternatively, a tunable phase element may be provided in one of the measurement propagation path and the reference propagation path such that the phase difference may be tuned so that the MZI device 110 always provides an output in the linear region. Using a tunable phase element may thus ensure that the output from the first MZI device 110 (and/or the second MZI device 130) is always in a linear region.

Figure 7:
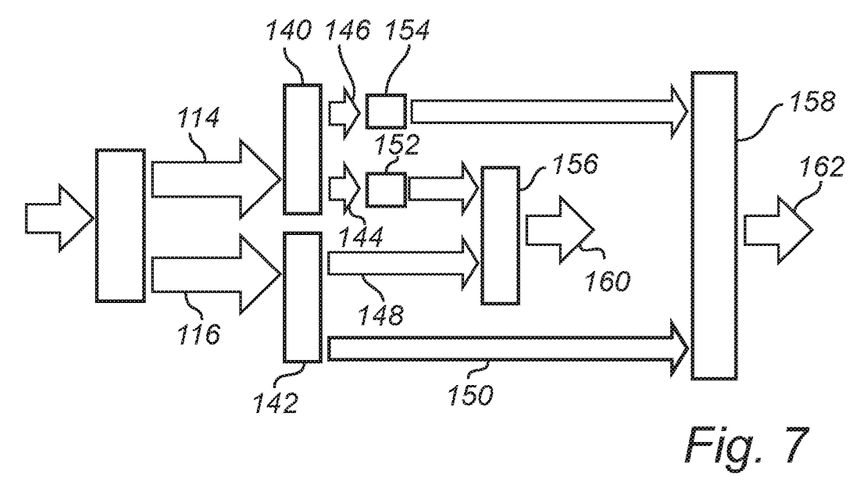
FIG. 7 is a schematic view illustrating two outputs from a Mach Zehnder-type interferometer device in a force sensing device.

Referring now to FIG. 7, a solution to ensuring that an output in the linear region is provided will be described. As shown in FIG. 7, light from the measurement propagation path of the MZI arm 114 may be input into a first light splitter 140. Further, light from the reference propagation path of the MZI arm 116 may be input into a second light splitter 142.

Each of the light splitters 140, 142 may split the input light into a first and a second output. Thus, a first measurement output 144 and a second measurement output 146 is provided and a first reference output 148 and a second reference output 150 is provided.

Further, first and second phase influencers 152 and 154 are configured to interact with the first and second measurement outputs 144, 146. The first and second phase influencers 152, 154 could alternatively be configured to interact with the first and second reference outputs 148, 150.

The first and second phase influencers 152, 154 may each be configured to provide a fixed phase offset to the signal affected by the phase influencer 152, 154. The phase offset provided by the first phase influencer 152 is different from the phase offset provided by the second phase influencer 154.

In one embodiment, one of the phase influencers 152 provides no phase offset at all. This could correspond to the device 100 not including any phase influencer in relation to the output. Thus, even though two phase influencers 152, 154 are illustrated in FIG. 7, only one may actually be provided in the device 100.

The device 100 may further comprise a first recombiner 156 and a second recombiner 158. The first recombiner 156 receives the first measurement output 144 (having passed the first phase influencer 152) and the first reference output 148. The first recombiner 156 is configured to recombine light from the pair of reference and measurement outputs and hence form a first output 160 of the MZI device 110. The second recombiner 158 receives the second measurement output 146 (having passed the second phase influencer 154) and the second reference output 150. The second recombiner 158 is configured to recombine light from the pair of reference and measurement outputs and hence form a second output 162 of the MZI device 110.

As a further alternative, the first and second phase influencers 152, 154 could be configured such that one phase influencer interacts with a reference output and another phase influencer interacts with a measurement output, wherein each of the first and the second recombiner 156, 158 is configured to receive an output that has passed a phase influencer.

Thanks to the phase influencers 152, 154 being configured to interact with the outputs from the light splitters 140, 142, the MZI device 110 may output a plurality of signals, one from each recombiner 156, 158, wherein the outputs 160, 162 have a phase offset in relation to each other.

Figure 8:
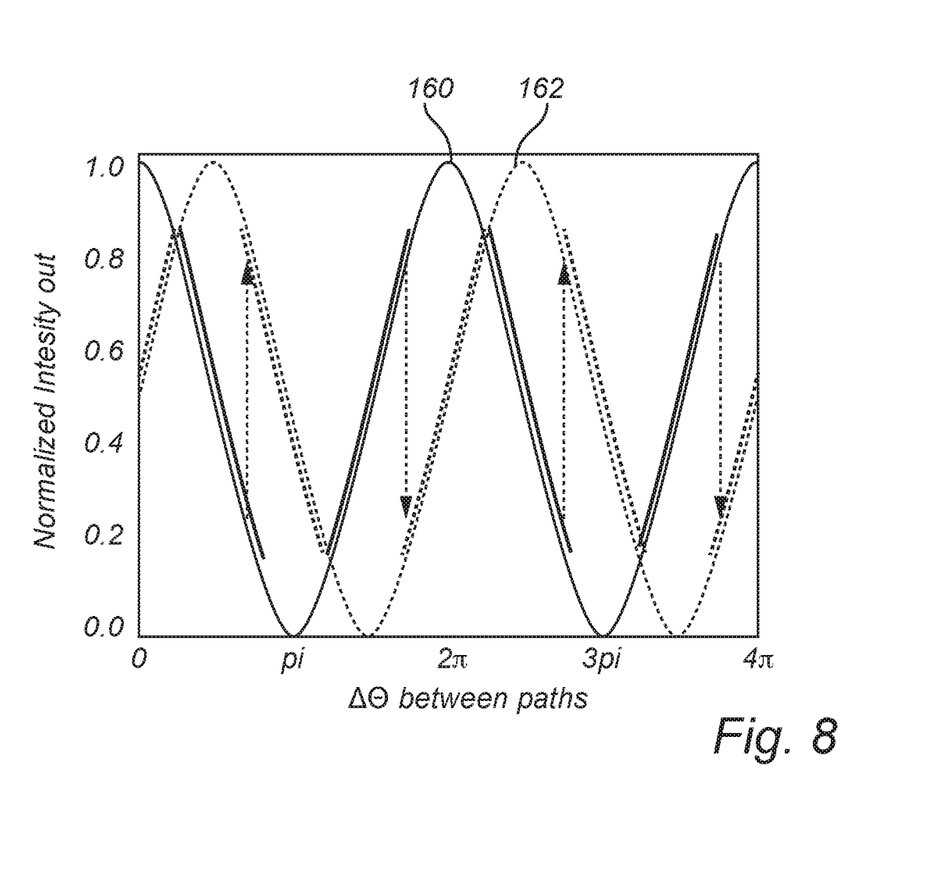
FIG. 8 is a chart illustrating a phase offset between the two outputs from a Mach Zehnder-type interferometer device in a force sensing device.

As shown in FIG. 8, a first output 160 and a second output 162 may thus be shifted in relation to each other, such that the linear regions of the outputs are associated with different force intervals, in this case pressure intervals. Hence, regardless of which pressure difference $\Delta P$ is provided across the membrane 120, an output is provided that may be used for determining the pressure difference $\Delta P$ with high accuracy.

The first output 160 may be associated with a phase influencer 152 providing a 0 phase offset (or the first output 160 may not be associated with any phase influencer). The second output 162 may be associated with a phase influencer 154 providing a phase offset of $\pi/2$. This implies that the linear regions of the outputs 160, 162 are evenly distributed for different pressure differences, ensuring that the outputs 160, 162 together always provide a linear region relating the output signal to the pressure difference $\Delta P$ across the membrane 120.

Furthermore, a relation between the first and the second output 160, 162 may be used for determining a relation between the output and a pressure difference $\Delta P$ such that a pressure interval associated with the output may be determined.

As shown in FIG. 8, if a value of the second output 162 is larger than a value of the first output 160, it may be concluded that a downward slope relation between the pressure difference $\Delta P$ and the output signal applies (i.e. the larger the pressure difference $\Delta P$, the smaller the value of the output signal), whereas if a value of the second output 162 is smaller than a value of the first output 160, it may be concluded that an upward slope relation between the pressure difference $\Delta P$ and the output signal applies. This fact may be used for increasing a pressure range $\Delta P_{range}$ in which the MZI device 110 may be sensitive, as it may now be differentiated between phase shifts up to $2\pi$.

Figure 9:
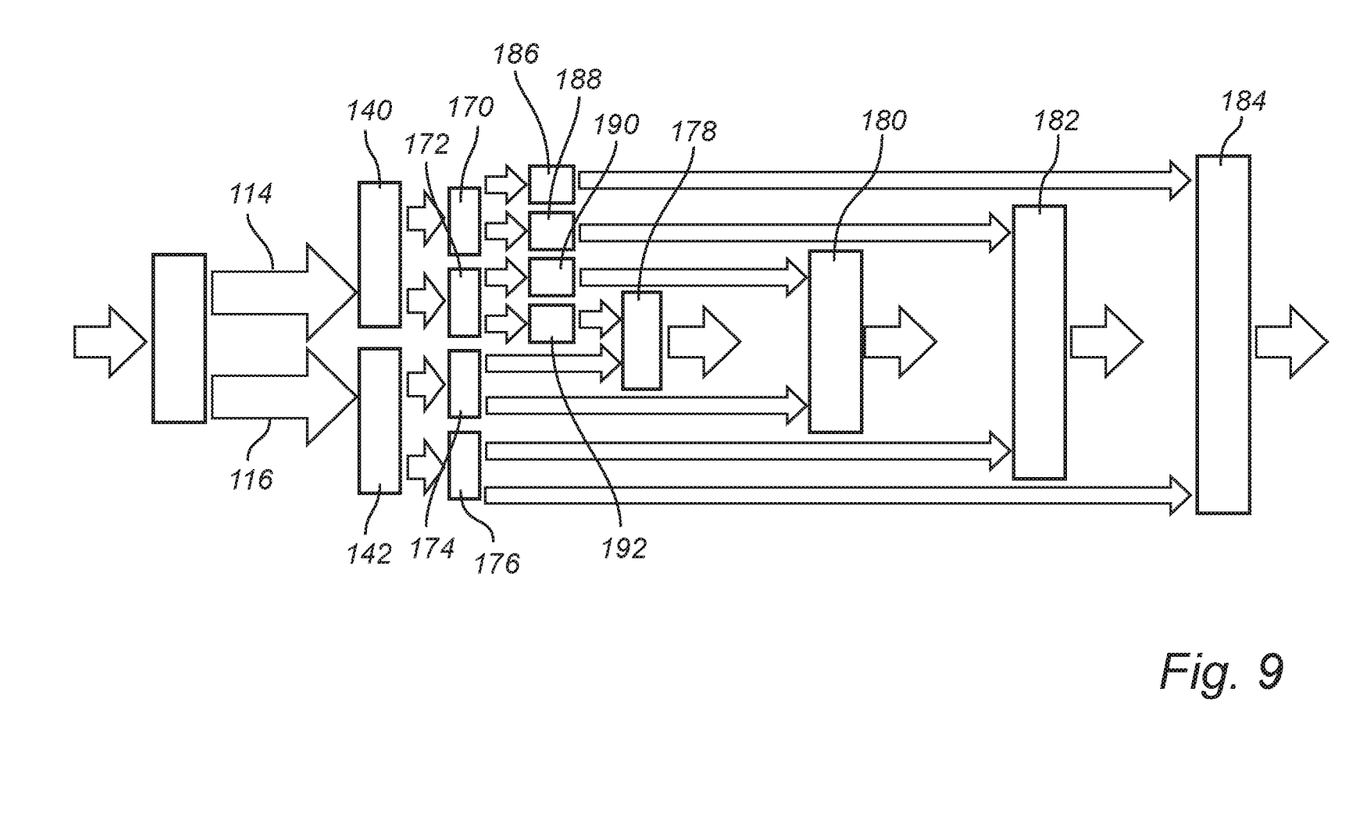
FIG. 9 is a schematic view illustrating a plurality of outputs from a Mach Zehnder-type interferometer device in a force sensing device.

As illustrated in FIG. 9, the output from the measurement propagation path and the reference propagation path may alternatively be split into further outputs. In FIG. 9, further light splitters 170, 172, 174, 176 are disclosed, wherein each of the further light splitters 170, 172, 174, 176 is configured to split an output from one of the first and second light splitters 140, 142 in two. However, it should be realized that the first and second light splitters 140, 142 may instead be configured to split light into more than two outputs. Also, the light splitters 140, 170, 172 may be considered to together form a first light splitter for splitting light from the measurement propagation path and the light splitters 142, 174, 176 may be considered to together form a second light splitter for splitting light from the reference propagation path.

The MZI device 110 now includes four recombiners 178, 180, 182, 184 for generating four different outputs. The outputs may have a phase offset in relation to each other. In this case, the phase offset may be $\pi/4$ between the outputs so that the linear regions of the outputs are evenly distributed for different pressure differences.

The phase influencers 186, 188, 190, 192 may thus be configured to provide fixed phase offsets of 0, $\pi/4$, $\pi/2$, and $3\pi/4$. The phase influencer providing a 0 phase offset may be omitted.

Figure 10:
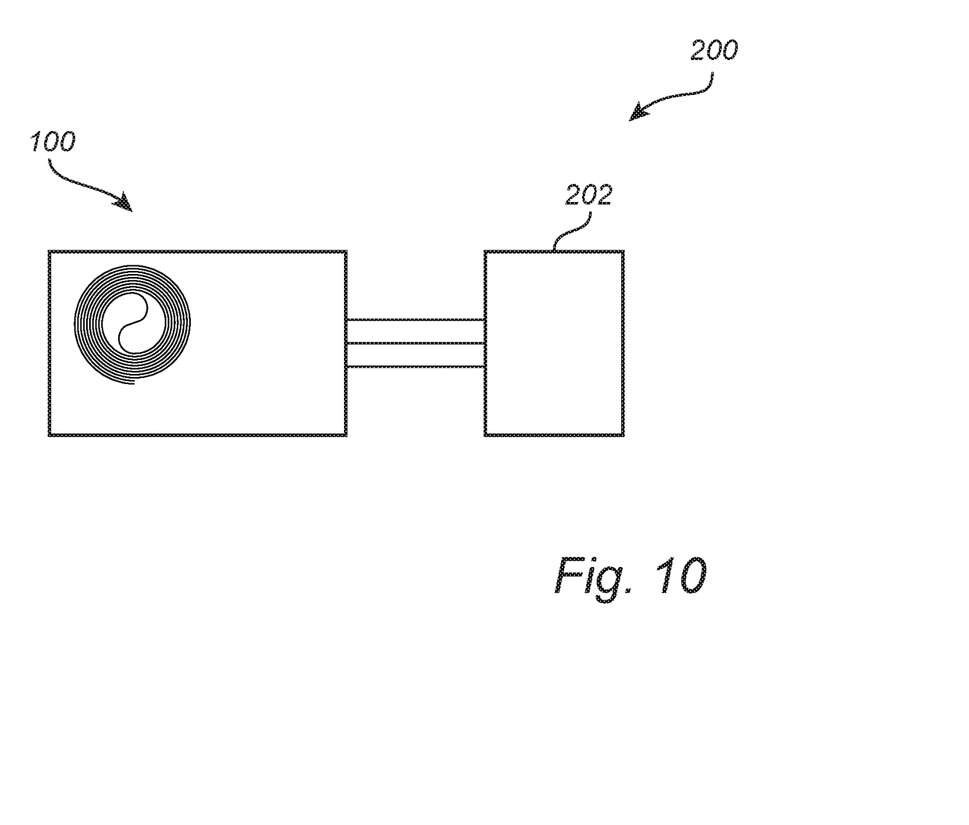
FIG. 10 is a schematic view of a force sensing system.

Referring now to FIG. 10, the force sensing device 100 may be integrated in a force sensing system 200. The force sensing system 200 may include a processing unit 202, which may be arranged to receive outputs from the MZI devices 110, 130.

The processing unit 202 may be a central processing unit (CPU). The processing unit 202 may alternatively be a special-purpose circuitry for providing only specific logical operations. Thus, the processing unit 202 may be provided in the form of an application-specific integrated circuit (ASIC), an application-specific instruction-set processor (ASIP) or a field-programmable gate array. The processing unit 202 may be configured to determine an applied force based on the received outputs.

The processing unit 202 may be connected to outputs from the MZI devices 110, 130 through a wired or wireless connection. The processing unit 202 may thus be arranged integrated with the sensing device 100. However, alternatively, the processing unit 202 may be remotely arranged, wherein the outputs from the MZI devices 110, 130 may be transmitted to the processing unit 202 through wireless communication.

The processing unit 202 may thus receive a first phase shift indicating signal from the first MZI device 110 and a second phase shift indicating signal from the second MZI device 130. The first phase shift indicating signal may be highly sensitive to the applied force and provided by a highly sensitive MZI device 110, whereas the second phase shift indicating signal may be less sensitive to the applied force and provided by a broad range MZI device 130.

The processing unit 202 may first coarsely determine an applied force based on the second phase shift indicating signal. This coarse determination may be used to indicate a force interval that applies to the first phase shift indicating signal of the highly sensitive MZI device 110. The processing unit 202 may then accurately determine an applied force based on the first phase shift indicating signal.

The processing unit 202 may e.g. comprise algorithms or a look-up tables for correlating values of the first and second phase shift indicating signals to applied forces, such as pressure differences $\Delta P$ across the membrane 120. The algorithm or look-up tables may include information based on calibration of the force sensing device 100, e.g. in association with manufacturing of the force sensing device 100.

Furthermore, as discussed above, the first MZI device 110 (and/or the second MZI device 130) may provide a plurality of outputs so that at least one output is in a linear region of a relation between a value of the output and an applied force.

The first phase shift indicating signal discussed above may in fact be a third phase shift indicating signal and a fourth phase shift indicating signal. Thus, the processing unit 202 may receive a third phase shift indicating signal form the first recombiner 156 and a fourth phase shift indicating signal from the second recombiner 158.

The processing unit 202 may then select a signal among the third phase shift indicating signal and the fourth phase shift indicating signal having a value in a linear region. The processing unit 202 may thus determine that the applied force is to be based on the selected signal. Alternatively, the force interval provided by the broad range MZI device 130 may give an indication which of the third or fourth phase shift indicating signals is within a linear region and the signal may thus be selected directly based on the coarse force determination based on the second phase shift indicating signal.

The processing unit 202 may further compare the value of the third phase shift indicating signal to the value of the fourth phase shift indicating signal. By means of the comparison, the processing unit 202 may determine a relation between the applied force and the selected signal. In particular, it may be concluded whether a downward slope relation between the applied force and the output signal applies or an upward slope relation between the applied force and the output signal applies. In this manner, the processing unit 202 may use a correct relation between the applied force and the selected signal for determining the applied force based on the selected signal.

The processing unit 202 may output the determined force to another processing unit (or another process being executed on the same processing unit), or for presentation on a display. The output determined force may then be used in any type of force sensing application, such as a pressure sensing application in automotive applications, medical diagnostics, altitude and depth measurements and flow sensing.

In the above the inventive concept has mainly been described with reference to a limited number of examples. However, as is readily appreciated by a person skilled in the art, other examples than the ones disclosed above are equally possible within the scope of the inventive concept, as defined by the appended claims.

For example, the first and second MZI devices 110, 130 may be differently sensitive to an applied force, such as a pressure difference ΔP across the membrane 120, but each of the signals from the first and the second MZI devices 110, 130 may be individually used for determining the force, such as the pressure difference ΔP. The first and second MZI devices 110, 130 may thus provide different pressure ranges and the pressure sensing device 100 may thus be configured for determining the pressure difference ΔP in a broad range but with different sensitivity in different parts of the range.

The invention claimed is:

1. A force sensing system comprising
a force sensing device, wherein the force sensing device comprises:
   a membrane, which is configured to deform upon receiving a force;
   a first Mach Zehnder-type interferometer device, comprising a first reference propagation path and a first measurement propagation path, wherein input light is split into the first reference propagation path and the first measurement propagation path and then recombined, and a phase difference of the light from the reference and measurement propagation paths provides a measurement of the force,
   a second Mach Zehnder-type interferometer device, comprising a second reference propagation path and a second measurement propagation path, wherein input light is split into the second reference propagation path and the second measurement propagation path and then recombined, and a phase difference of the light from the reference and measurement propagation paths provides a measurement of the force,
   wherein the first measurement propagation path and the second measurement propagation path are arranged on or in the membrane, and
   wherein the first measurement propagation path and the second measurement propagation path are differently sensitive to applied force on the membrane,
   a first light splitter and a second light splitter, wherein light from the first reference propagation path is split into a first and a second reference output, and light from the first measurement propagation path is split into a first and a second measurement output,
   a plurality of recombiners, wherein each recombiner is configured to recombine light from a pair of a reference output and a measurement output, and
   at least one phase influencer configured to offset a phase between different pairs of recombined light,
   wherein the force sensing device is configured to output at least two different phase shift indicating signals from the first Mach Zehnder-type interferometer device; and
a processing unit, which is configured to:
   receive at least two phase shift indicating signals from the first Mach Zehnder-type interferometer device and a second phase shift indicating signal from the second Mach Zehnder-type interferometer device,
   determine a force interval based on the second phase shift indicating signal;
   select one of the two different phase shift indicating signals from the first Mach Zehnder-type interferometer device on which to base the determining of an accurate sensed force; and
   determine an accurate sensed force within the force interval based on the selected phase shift indicating signal from the first Mach Zehnder-type interferometer device,
   wherein at least one of the two different phase shift indicating signals is associated with the sensed force in a linear or substantially linear relation.

2. The force sensing system according to claim 1, wherein the first measurement propagation path and the second measurement propagation path are configured to cause a phase shift of light propagated through the first and the second measurement propagation paths, wherein the phase shift is dependent on applied force on the membrane and the caused phase shift is different between first measurement propagation path and the second measurement propagation path.

3. The force sensing system according to claim 1, wherein the first measurement propagation path is longer than the second measurement propagation path.

4. The force sensing system according to claim 3, wherein the first measurement propagation path is spiral-shaped.

5. The force sensing system according to claim 4, wherein the second measurement propagation path is spiral-shaped, and wherein a number of loops of the spiral-shape and/or a radius of the spiral-shape differs between the first measurement propagation path and the second measurement propagation path.

6. The force sensing system according to claim 4, wherein the first measurement propagation path is centrally arranged in or on the membrane and the second measurement propagation path is arranged outside the spiral-shape of the first measurement propagation path.

7. The force sensing system according to claim 1, wherein the first measurement propagation path and the second measurement propagation path are differently positioned in relation to a center of the membrane.

8. The force sensing system according to claim 1, wherein the first and second light splitters are configured to form two pairs of a reference output and a measurement output, wherein the at least one phase influencer is configured to cause a phase offset of $\pi/2$ between the pairs.

9. The force sensing system according to claim 1, wherein the force sensing device is a micro-opto-mechanical device formed on a semiconductor substrate, wherein the membrane is supported by the substrate and comprises an exposed surface which is sensitive to an applied force.

10. A method for sensing a force, said method comprising:
receiving a first phase shift indicating signals from a first Mach Zehnder-type interferometer device, comprising a first reference propagation path and a first measurement propagation path, wherein input light is split into the first reference propagation path and the first measurement propagation path and then recombined, wherein the first measurement propagation path is arranged on or in a membrane which is configured to deform upon receiving a force, and the first phase shift indicating signal indicates a phase difference of the light from the first reference and the first measurement propagation paths as a measurement of the force;
wherein at least two different phase shift indicating signals are received from the first Mach Zehnder-type interferometer device forming a first phase shift indicating signal with a first phase offset and a first phase shift indicating signal with a second offset;
receiving a second phase shift indicating signal from a second Mach Zehnder-type interferometer device, comprising a second reference propagation path and a second measurement propagation path, wherein input light is split into the second reference propagation path and the second measurement propagation path and then recombined, wherein the first measurement propagation path is arranged on or in a membrane and the second phase shift indicating signal indicates a phase difference of the light from the second reference and the second measurement propagation paths as a measurement of the force, wherein the first measurement propagation path and the second measurement propagation path are differently sensitive to applied force on the membrane;
determining a force interval based on the second phase shift indicating signal;
selecting one of the first phase shift indicating signal with the first phase offset and the first phase shift indicating signal with the second offset on which to base determining of an accurate sensed force; and
determining the accurate sensed force within the force interval based on the selected phase shift indicating signal from the first Mach Zehnder-type interferometer device,
wherein at least one of the two different phase shift indicating signals is associated with the sensed force in a linear or substantially linear relation.

* * * * *